Feb. 27, 1968     F. C. MOORE ET AL     3,370,959
METHOD OF FLAVORING POULTRY MEAT
Filed April 30, 1964
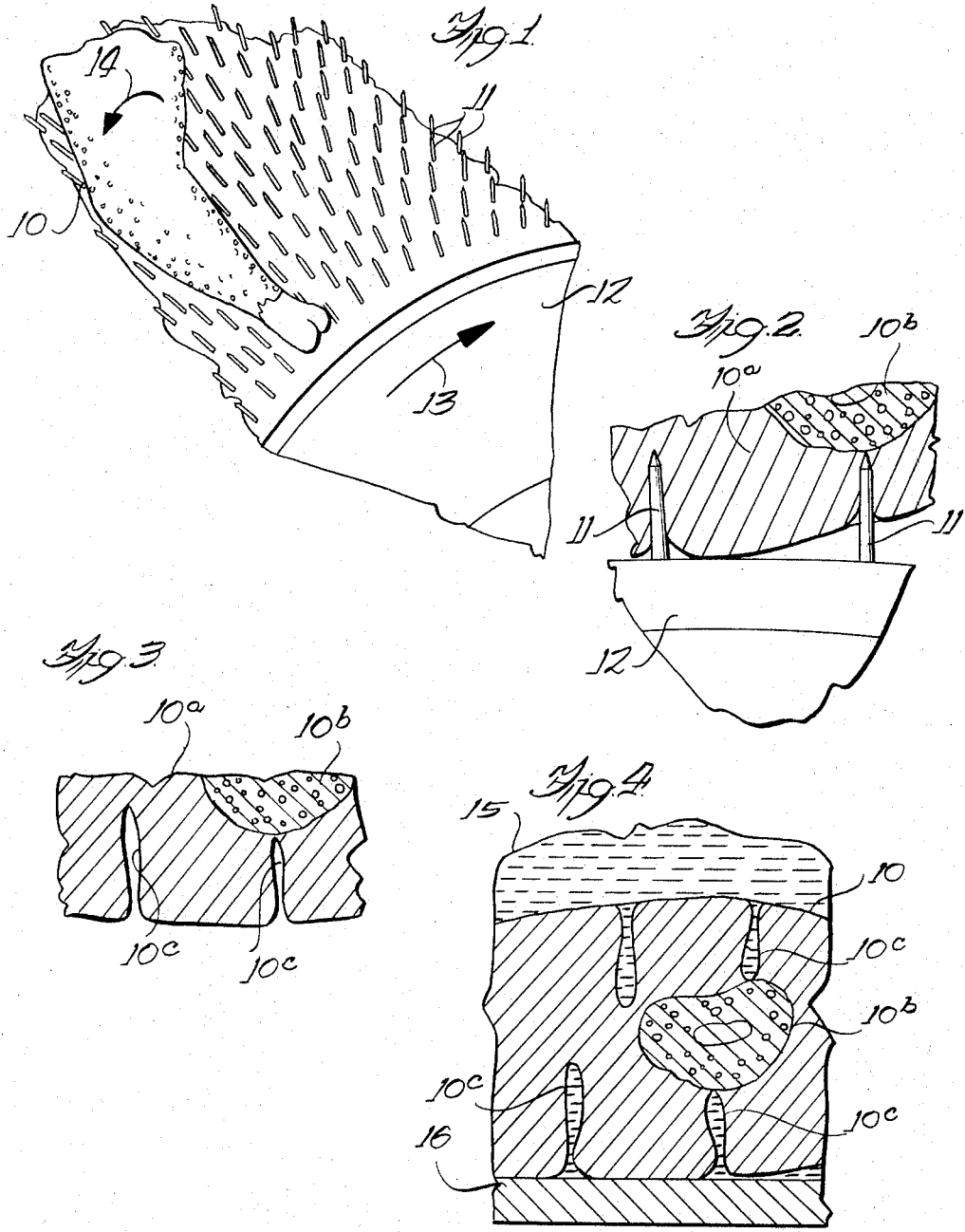

United States Patent Office 3,370,959
Patented Feb. 27, 1968

3,370,959
METHOD OF FLAVORING POULTRY MEAT
Francis C. Moore, Wilbur E. Fernandes, and Marvin W. Nicely, Indianapolis, Ind., assignors to Poly-Tech Inc., Indianapolis, Ind., a corporation of Indiana
Filed Apr. 30, 1964, Ser. No. 363,891
4 Claims. (Cl. 99—107)

This invention relates to a method of flavoring meat, and more specifically, to a method particularly suitable for the flavoring of lean fine-grained meats such as poultry meat.

Considerable difficulty is often encountered in adequately flavoring poultry meat and other meats which are lean and which do not have a coarse cellular structure because the flavoring agents do not readily penetrate the meat. This is particularly true where the poultry carcasses or carcass sections remain substantially intact during preparation and cooking and especially where such sections do not present a transversely-cut surface exposing the ends of the meat fibers. Under such circumstances, even prolonged exposure of the outer surfaces of the meat to flavoring agents, or the submerging of the meat in such agents for extended periods of time, fail to result in adequate penetration by the agents.

It is therefore an object of the present invention to provide a method for flavoring poultry meat and other fine-grained meats which results in substantially uniform distribution of the flavoring agent throughout the meat. Another object is to provide a fast and highly effective method for introducing a flavoring agent into the meat so that it will tend to become evenly distributed throughout the body of meat. In this connection, it is a specific object to provide a method in which such a flavoring agent is forced into the meat, and retained for even distribution therein, by normal atmospheric pressure.

It is still a further object of the present invention to provide a method of flavoring the meat of poultry carcasses or carcass sections without significantly altering the appearance of the carcasses or sections. Specifically, it is an object of the invention to treat the meat of poultry carcass sections prior to cooking without significantly altering the appearance of the meat and without first separating it from the bones of each section.

Other objects will appear from the specification and drawings in which:

FIGURE 1 is a broken perspective view illustrating the initial step of perforating the meat of a poultry leg section;

FIGURE 2 is a greatly enlarged and somewhat diagrammatic fragmentary sectional view of the carcass section as the meat thereof is perforated;

FIGURE 3 is an enlarged and somewhat diagrammatic fragmentary sectional view similar to FIGURE 2 but illustrating the meat after it has been perforated to form pockets or cavities therein;

FIGURE 4 is an enlarged fragmentary sectional view of the meat section after it has been submerged in liquid contained within a vacuum chamber and the vacuum has been released to force the liquid into the cavities in the meat.

An important aspect of the present invention lies in the discovery that liquid flavoring agents may be substantially uniformly distributed throughout fine-grained meats such as poultry meats by first perforating the meat and thereafter forcing the flavoring agents under pressure into the cavities or pockets formed during the perforation step. Such results are obtained despite the fact that soaking or steeping such meat, whether perforated or not, in a solution containing such an agent is generally ineffective in achieving uniform flavoring in the absence of the application of pressure. Also, the application of pressure in an effort to force a solution containing a flavoring agent into poultry meat or other fine-grained meat which is unperforated will not bring about anything more than the flavoring of the skin or the surface layer of the meat.

The method steps of the present invention have been illustrated in the drawings as applied to poultry carcass sections although it is to be understood that the method may also be used with sections or pieces of other fine-grained meats which are substantially non-porous, are not heavily "marbelized," and are generally incapable of absorbing liquid treating agents in normal steeping or soaking operations. Unlike coarse-grained meats, poultry meat is dense and of fine texture. Also, it is rarely cut across its grain until after it has been cooked and is being prepared for service. Thus, following conventional culinary practice, seasoning or flavoring agents applied to poultry meat tend to remain on the skin or at most penetrate no deeper than the outer layer of meat.

In the present method, the poultry processor first dresses the poultry and then sections it into pieces of a size suitable for sale to the consumer. Normally, the poultry carcasses will be separated into leg sections, wing sections and breast sections. To exemplify the initial method step, we have shown a leg section 10 in FIGURE 1; however, it is to be understood that this step as well as subsequent steps may be carried out with other poultry sections, and that, if desired, the leg section may first be separated into a thigh section and a lower leg or "drumstick" section.

Leg 10 is urged into contact with the nails or pins 11 which, in the illustration given, are mounted upon the surface of a rotatable drum 12. The nails are sharply pointed so that they will readily pierce the meat of the leg in directions generally extending transversely with respect to the grain or to the fibers of the meat. The length and diameter of the nails may be varied considerably depending on the size of the poultry sections to be perforated. In the case of chickens, it has been found that nails of a length ranging between ⅜ inch to ¾ inch, and a diameter ranging between ¹⁄₃₂ inch to ³⁄₃₂ inch, are particularly effective. Such nails are of sufficient length to pass through the meat to the bone and are of large enough cross section to leave small air pockets or cavities after they are withdrawn.

The density of the nails for a given unit area of the drum's surface may also vary to a considerable extent. The distance between adjacent nails must be great enough so that the meat is not macerated, preferably so that its appearance is not even significantly altered, and yet must be small enough so that a liquid flavoring agent may be substantially uniformly distributed throughout the meat. The density is to some extent dependent on the dimensions of the nails and the size of the meat sections to be perforated thereby. Again, in the case of poultry and especially chickens, it has been found that a density within the range of approximately 4 to 25 nails per square inch of drum surface has been found effective, with an optimum density being approximately 9 nails per square inch.

While a drum 12 is illustrated as the nail-supporting means, it is to be understood that such nails may alternatively be carried by other suitable means such as, for example, a belt or plate. A drum has been found particularly effective as the nail-supporting means because the carcass sections may be rolled over the surface thereof as the drum rotates. Thus, as drum 12 rotates in the direction indicated by arrow 13, leg 10 may be rotated in the opposite direction indicated by arrow 14 so that substantially all of the areas of meat thereon will be perforated by nails 11. To produce relative rotation of the leg section upon moving drum 12, the section may be engaged by any suitable friction device (such as a drum or belt) rotating in a direction opposite to the direction of rotation of drum 12. The legs may also be rotated by hand as long as suitable protective gloves are worn by the operator.

FIGURE 2 illustrates in enlarged and somewhat diagrammatic fashion a portion 10a of leg section 10 as it is perforated by nails 11. It will be observed that the nails 11 pierce the meat to the bone 10b. After the leg section is removed from the drum 12, the withdrawn nails leave air pockets or cavities 10c in the meat (FIGURE 3).

Following perforation, the meat sections are placed in a body of liquid 15 in a vacuum chamber 16, the liquid containing in solution one or more suitable flavoring agents. For purposes of this application, it is to be understood that the term "flavoring agent" includes flavor intensifying agents such as monosodium glutamate. Salt (sodium chloride) may also be present in solution, along with any other suitable and soluble flavoring agents. The vacuum chamber 16 is itself entirely conventional and since such structures are well known in the art, a more complete description and showing is believed unnecessary for purposes of disclosing the method of the invention.

After the perforated sections are submerged in the liquid and the vacuum chamber is sealed, air is withdrawn from the chamber until a negative pressure greater than 20 inches of mercury is achieved. This vacuum is held for 2 to 10 minuets and results in the withdrawal of substantially all air from the artificially-created cavities 10c of the meat. In the treatment of poultry carcass sections, it has been found that optimum results are obtained if a negative pressure of approximately 26 inches of mercury is maintained for approximately 5 minutes.

After such treatment, the vacuum is then released and the flavoring agent solution is forced by atmospheric pressure into cavities 10c (FIGURE 4). The meat sections may thereafter be removed from the liquid, the normal atmospheric pressure helping to maintain a portion of the liquid within the meat and within the cavities thereof.

It is believed that the effectiveness of the present method for flavoring fine-grained meat lies in the fact that nails 11 pierce the meat in directions extending generally transversely with respect to the meat's grain. In so doing, the nails tend to cut across the meat fibers. After the nails have been withdrawn, the ends of such meat fibers are exposed within the pockets or cavities and when the liquid flavoring agent is later forced by air pressure into such pockets the liquid tends to pass longitudinally along the meat fibers into the areas between the perforations. In other words, the perforating of the meat in directions transverse to the fibers or grain thereof, followed by the application of a liquid flavoring agent under substantial air pressure, results in a migration of the flavoring agent between adjacent cavities and produces a substantially uniform distribution of the flavoring agent throughout the body of the meat. All of this is achieved without significantly altering the appearance of the meat sections, the perforations being of small size as previously described.

It has been found that distribution of the flavoring agent throughout the meat may be facilitated if positive pressure is applied to force the liquid into the cavities and into the meat surrounding the cavities. The extent of such positive pressure and the duration of its application may be varied considerably and such positive pressure may be applied immediately following the evacuation step described above. Thus, to aid in the distribution of flavoring agent following the evacuation step already described, the pressure, instead of being returned only to atmospheric level, may be increased above atmospheric pressure for a selected interval.

While in the foregoing we have disclosed an embodiment of the invention in considerable detail for purposes of illustration, it will be understood by those skilled in the art that many of these details may be varied without departing from the spirit and scope of the invention.

We claim:

1. A method of flavoring poultry meat which is substantially non-porous and incapable of absorbing liquid treating agents in normal steeping or soaking operations comprising the steps of piercing a poultry carcass section to form a multiplicity of small and substantially uniformly-spaced air pockets extending inwardly from the surface toward the skeletal components thereof in directions substantially transverse to the grain of the meat and terminating within the carcass section, the density of pockets formed in said meat falling within the range of between about 4 to 25 pockets per square inch of meat surface, then immersing the pierced carcass section in a liquid flavoring agent within a closed container, then withdrawing air from the pockets pierced in said carcass section while the same is immersed in said flavoring agent by withdrawing air from said container to achieve a negative pressure in excess of 20 inches of mercury, and thereafter forcing said liquid flavoring agent into said pockets and into the meat surrounding said pockets by restoring air pressure within said container to a normal atmospheric level.

2. The method of claim 1 in which said negative pressure is maintained within said container for a period within the range of approximately 2 to 10 minutes.

3. The method of claim 1 in which there is the additional step of increasing pressure within said container above atmospheric pressure.

4. The method of claim 1 in which said pockets are formed by piercing elements each having a diameter within the range of $1/32$ to $3/32$ of an inch.

References Cited

UNITED STATES PATENTS

| | | | |
|---|---|---|---|
| 96,978 | 11/1869 | Sherwood | 99—159 |
| 106,632 | 8/1870 | Spear | 99—157 |
| 2,128,952 | 9/1938 | Mareta | 99—107 |
| 2,629,311 | 2/1953 | Graves | 99—159 X |
| 2,687,961 | 8/1954 | Ellis | 99—107 |
| 2,688,555 | 9/1954 | Komarik et al. | 99—159 |
| 2,816,320 | 12/1957 | Brown | 99—159 X |

HYMAN LORD, *Primary Examiner.*

A. LOUIS MONACELL, *Examiner.*